C. J. BRILSTRA.
AMUSEMENT RIDE.
APPLICATION FILED DEC. 22, 1921.
1,431,564.  Patented Oct. 10, 1922.
5 SHEETS—SHEET 2.
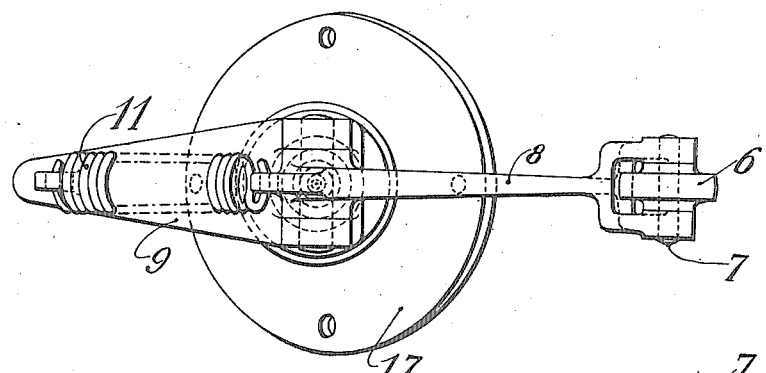
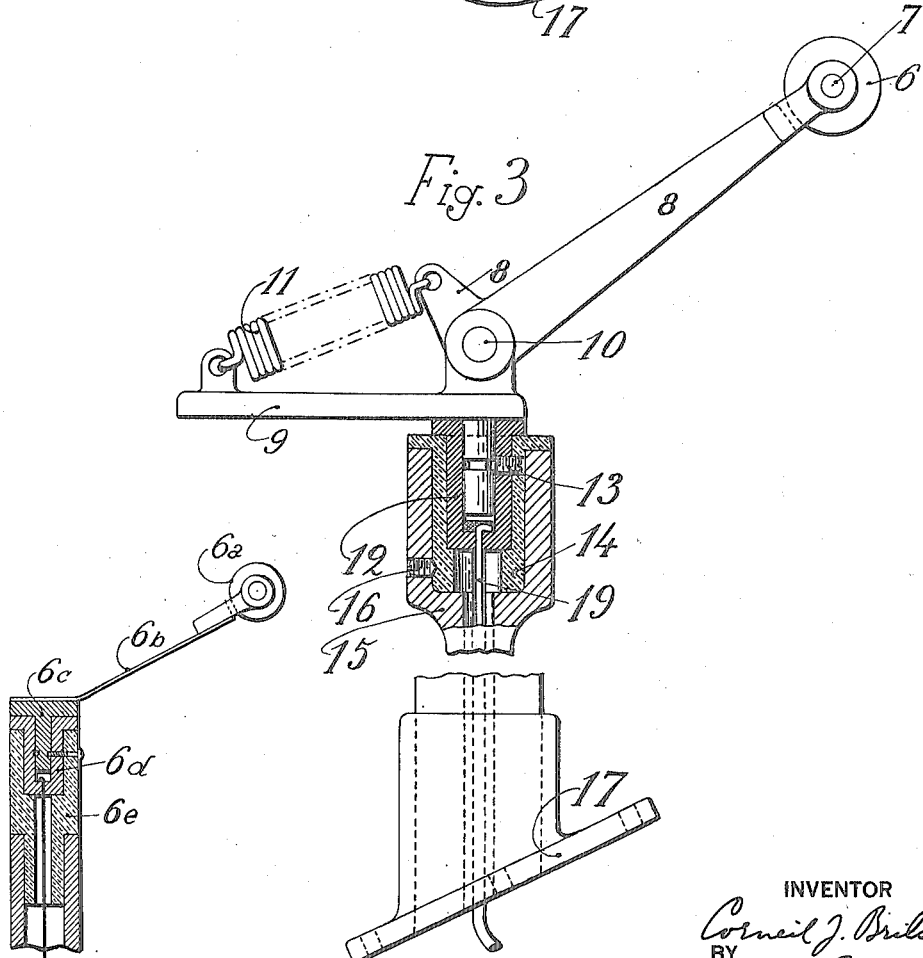
INVENTOR
Corneil J. Brilstra
BY
ATTORNEY

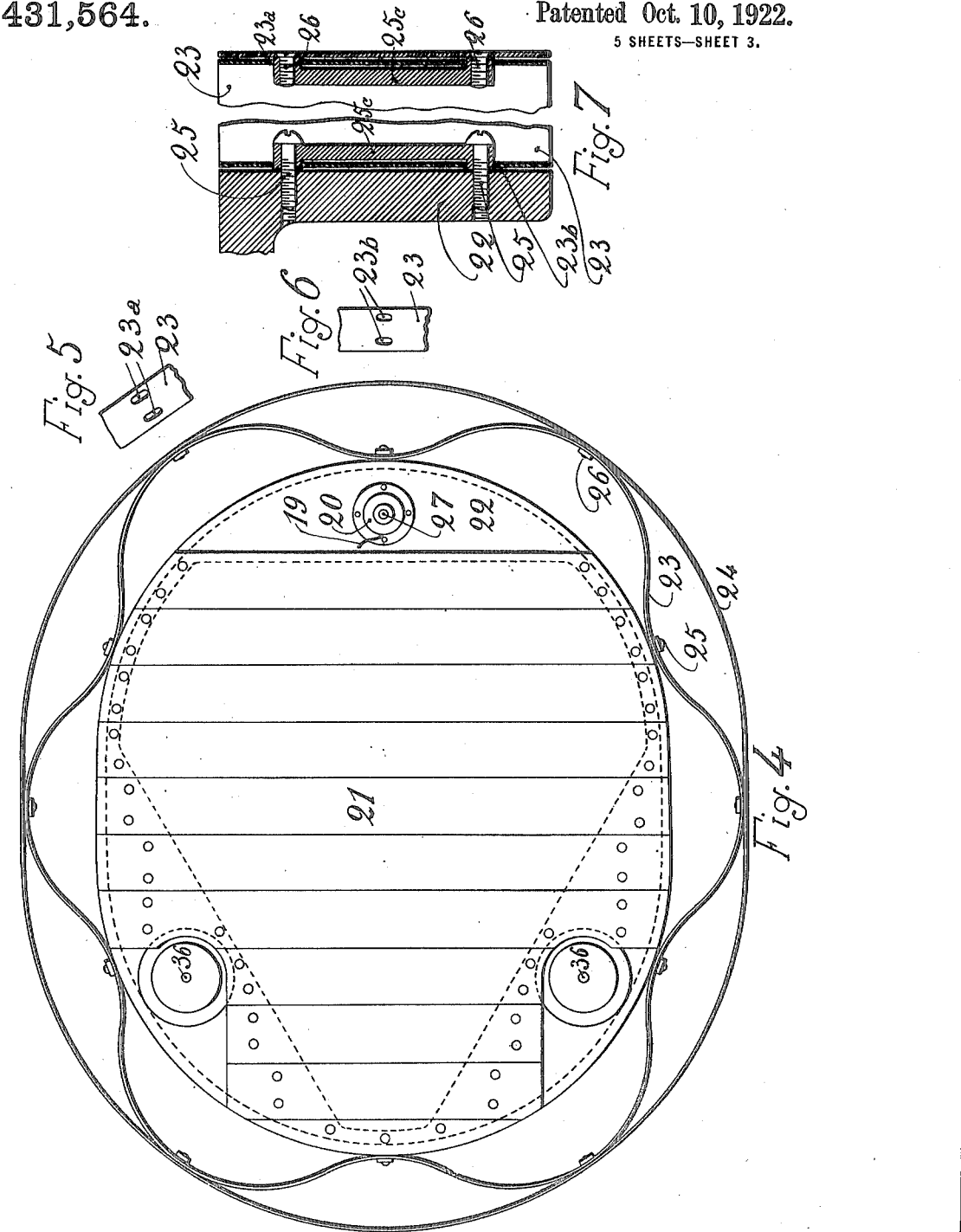

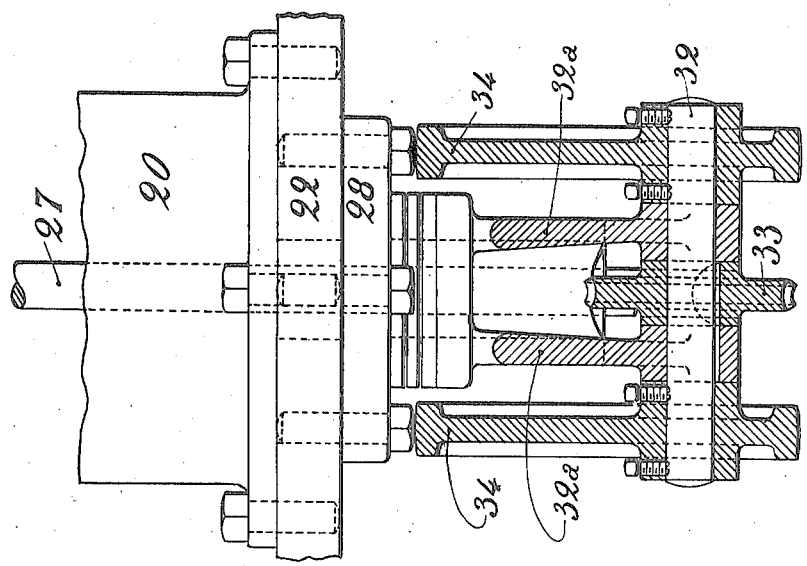
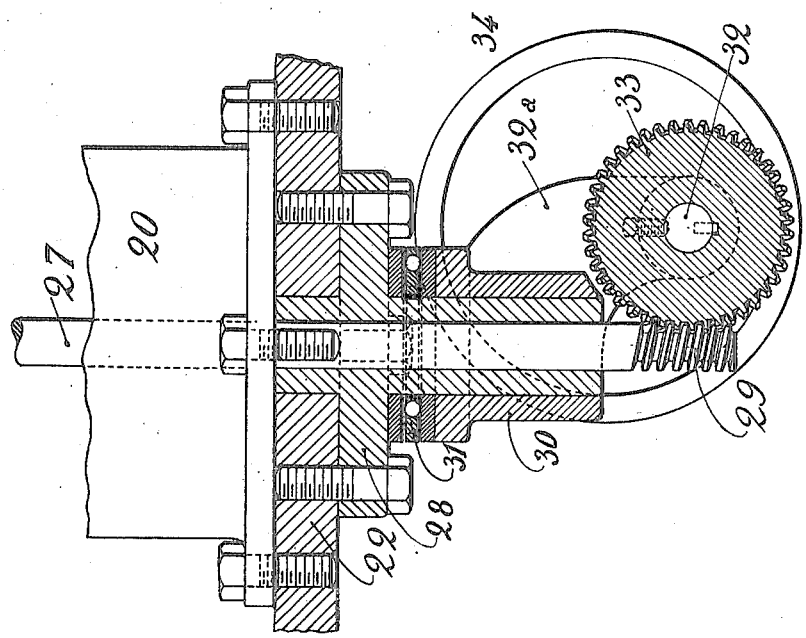

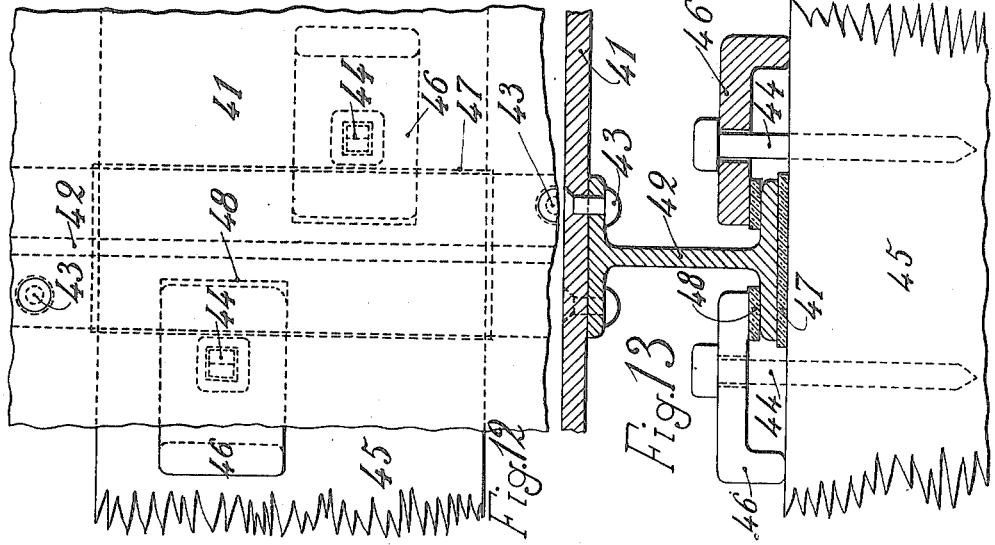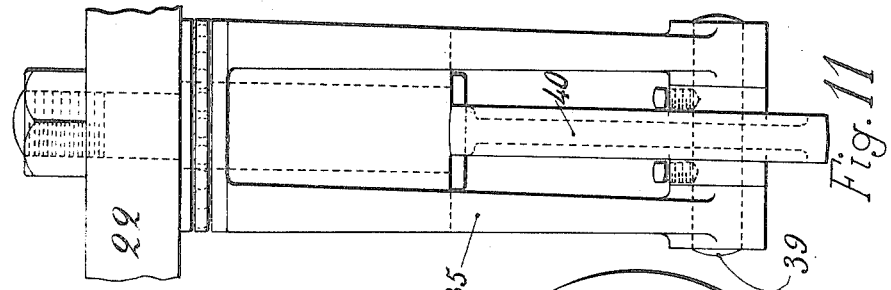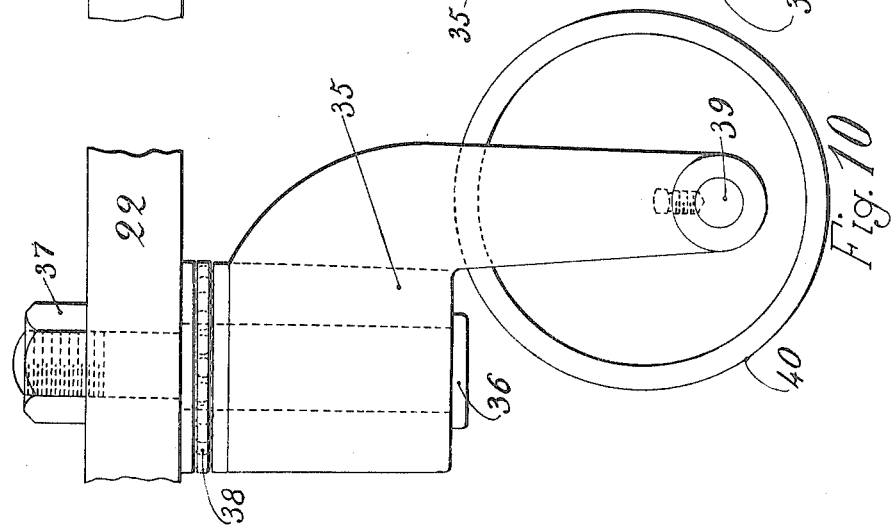

Patented Oct. 10, 1922.

1,431,564

UNITED STATES PATENT OFFICE.

CORNEIL J. BRILSTRA, OF BROOKLYN, NEW YORK.

AMUSEMENT RIDE.

Application filed December 22, 1921. Serial No. 524,088.

*To all whom it may concern:*

Be it known that I, CORNEIL J. BRILSTRA, a citizen of the United States, residing at 2942 West 17th Street, Brooklyn, New York city, New York, have invented new and useful Improvements in Amusement Rides, of which the following is a specification.

My invention relates to an amusement ride and particularly to one in which a number of mechanically operated animals, as for example horses, which carry passengers, move independently of each other, over the entire area of a floor.

Among the objects of my invention are:

First, to provide amusement for the general public;

Second, to produce in the riders a sensation similar to that experienced by the cowboys while "breaking" wild horses;

Third, to produce a mechanical horse which will rock from side to side and from front to rear and which will continually and independently change its rocking movement;

Fourth, to produce a mechanical horse which takes a haphazard or irregular path of travel over the floor;

Fifth, to provide each horse with a bumper having a recoil powerful enough to easily change the horse's direction when it strikes another horse, or the curbing at the edge of the floor;

Sixth, to provide an improved trolley for each horse;

Seventh, to provide means for preventing the passengers from being thrown from the horses when they suddenly change their direction.

With the above and other objects in view my invention consists in the parts, combinations and improvements more fully pointed out hereinafter.

Referring to the accompanying drawings which illustrate one embodiment of the invention:

Figs. 2 and 3 show respectively a plan view and a side elevation partly in section, of the trolley shown in Fig. 1.

Fig. 4 is a plan view of the platform and bumper shown;

Figs. 5, 6 and 7 are detail views showing the construction of the bumper;

Figs. 8 and 9 are cross-sectional views showing the construction of the unit for driving the platform;

Figs. 10 and 11 are respectively a side and an end elevation of one of the front wheels;

Figs. 12 and 13 are respectively a plan view and a cross-sectional view of a section of floor upon which the platform travels, and Fig. 14 is a view of a modified form of trolley.

Figure 1:
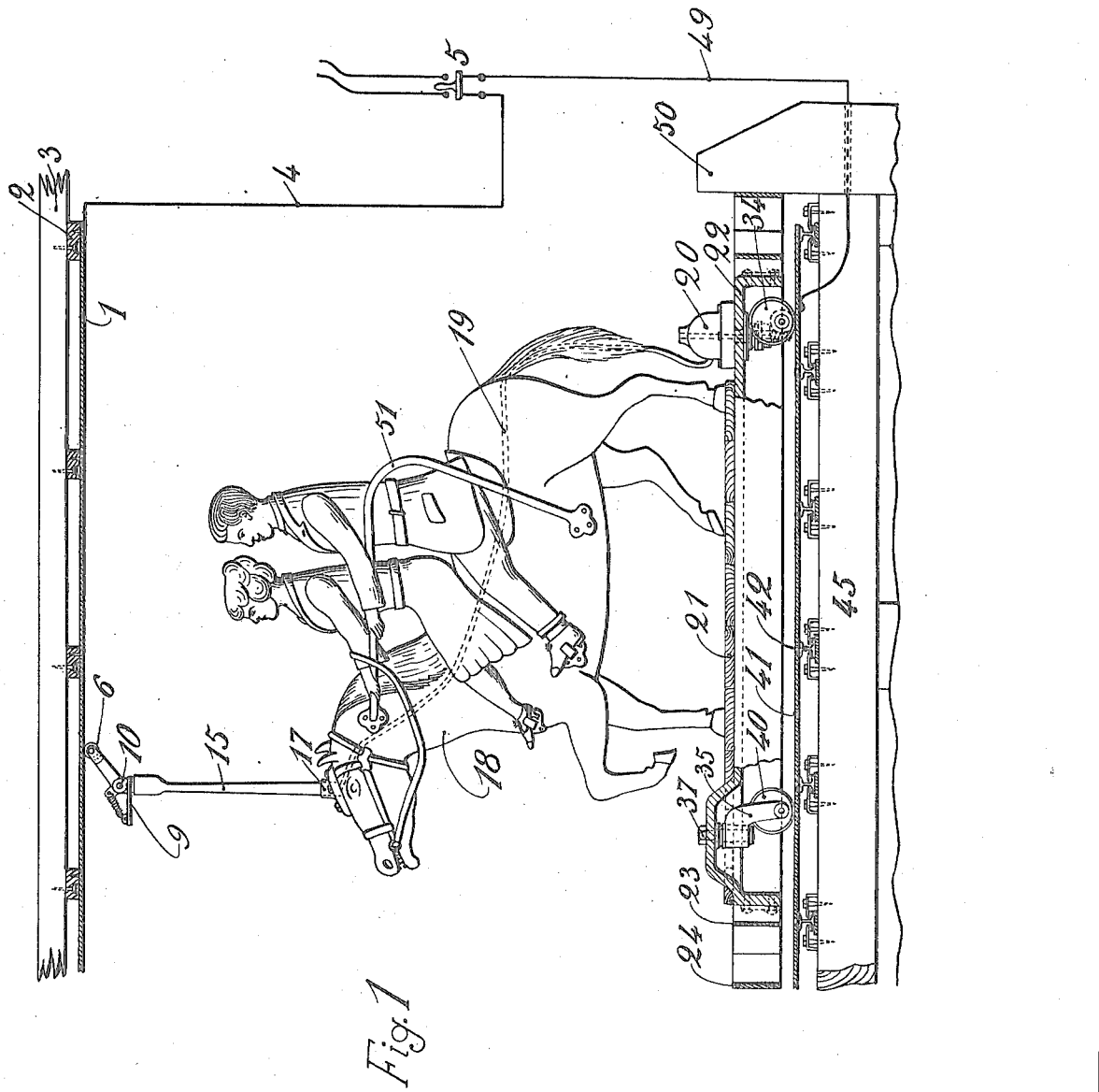
Figure 1 is a side elevation of one entire unit, showing the general arrangement of all parts.

The metal ceiling 1 is fastened to the fibre blocks 2 which are fastened to the ceiling joists 3, thus insulating the metal ceiling from the building. The current is carried to the metal ceiling by the line 4, which leads from the switch 5 which is closed while the horses are in action and open when they are at rest.

The trolley roller 6 is continually in contact with the metal ceiling 1 and is fastened to the pin 7 which revolves in the forked lever 8. The lever 8 is loosely mounted in the fork of the block 9 by the pin 10, and the trolley roller 6 is held against the ceiling 1 by the tension of spring 11 which is hooked into projections on the lever 8 and the block 9.

Another construction of the trolley is shown in Figure 14, in which the trolley-roller fork 6ª is fastened to one end of a flat spring 6ᵇ, the other end of the spring being fastened to the pivot stud 6ᶜ fitting in the metal bushing 6ᵈ on the trolley pole; the trolley pole being separated from the metal bushing by an insulator 6ᵉ.

Means are provided for permitting the trolley base to freely turn on its pivot, preferably throughout a complete circle, thus permitting the trolley roller to follow and not to lead or precede the center of the trolley pole, irrespective of the direction of travel of the platform. To the under side of block 9, is secured a grooved plug which fits loosely into the bushing 12, and is prevented from being lifted out by the pivot-pointed screw 13, which fits into the groove in the plug of block 9. The block 9 may thus be freely rotated in any direction, so that no matter in which direction the horse is traveling, the roller 6 will follow and not lead or precede the center of the trolley pole. The screw 13 besides performing the function previously explained, also prevents the bushing 12 from turning in or being removed from the insulating bushing 14, which in turn is held in the trolley pole 15 by the set screw 16. The trolley pole 15 is fastened into the flange 17, which is fastened to the forehead of the horse 18. To the lower end of bushing 12, is soldered one end of an insulated wire 19 which conducts the current from the trolley to the motor 20, through the inside of the horse 18.

The horse is secured to the platform in any desired manner. As illustrated, the feet of the horse 18 are bolted to the wooden floor 21, which in turn is bolted to the platform 22. This platform is supported by three or more wheels and is surrounded by a bumper. In accordance with my invention, this bumper is composed of two endless bands or hoops 23 and 24, supported by studs 25 and 26, the hoops being of different diameters.

By placing the larger hoop within the smaller one, it is deflected in such a way as to strengthen the collapsing resistance of the outer hoop. The inner hoop 23 is slotted at 23ª at the points of contact with the outer hoop 24, and at 23ᵇ at its points of connection with the carriage 22, for the purpose of receiving the clips and bolts 25, 26 and 25ᶜ which act as supports for the different contours of the inner hoop and also support both hoops. These bolts and clips are so constructed and fastened, and the slots (see Figs. 5 and 6) are of such a length as to allow a sliding motion at the points of contact when the outer hoop is subjected to an external pressure or force. The clips 25ᶜ prevent the hoops from escaping.

The operation of the bumper is as follows:

If a single hoop is subjected to an external force applied at one point, the bending resistance of the metal in the hoop will resist the external force; but if the external force be greater than the bending resistance of the steel, the hoop will first assume an oval shape and then collapse.

By placing a larger hoop within the smaller one against which the external force is applied, as shown in Fig. 4, the external force, which is applied at one point on the outer hoop, is distributed over both hoops, throughout their length and resistance of the outer hoop against collapsing is many times increased.

When an external force is applied at one point, the first shock of the impact is taken up by the bending resistance of the outer hoop, and the sliding motion at the points of contact. The hoop begins to bend and in so doing it reduces its included area.

I place within the outer hoop an inner, metallic, elastic hoop having a plurality of undulations which are in contact with and support the outer hoop. As the outer hoop continues to bend, the area occupied by the contours of the inner hoop is reduced. The length of the inner hoop and its contours are forced into a smaller space, and the shape of the contours is changed.

As the line of contact of each contour of the inner hoop acts as a fulcrum, the shape of one contour cannot be changed by the application of an external force without bending and changing the shape of adjacent contours; but by changing the shape of adjacent contours the external force or the resistance thereto is distributed over the adjacent contours of the inner hoop and a larger surface of the outer hoop, thus enabling both hoops to resist a much greater external force without collapsing.

Means are provided for driving the platform preferably without steering or guiding the platform. These means may be varied. As illustrated, the motor 20 is bolted to the carriage 22, and some form of driving gear, as for example a long armature shaft 27 which extends through the bearing 28, is provided which has a worm 29 cut at its lower end. The bearing 28 is bolted to the carriage 22, and forms a pivot around which the rear wheel bearing 30 may rotate, the friction between these two being reduced by the ball thrust-bearing 31.

The platform is supported at three points, under each of which is a wheel unit.

Means are provided for causing portions of the platform to alternately rise and fall, causing the horse to rock from front to rear and also sideways.

One wheel is placed at each side of the carriage and near the head of the horse. One or more wheels are placed at the rear of the platform. Each wheel is mounted to rotate in or on a bearing, as for example on a shaft or axle passing through the hub of the wheel. One or more of the supporting wheels may be constructed with a varying effective radius. These may assume various forms. In the form illustrated the wheels are made circular and each is pivotally mounted on an axis which is eccentrically located. When the carriage is moved across the floor, these wheels revolve, thus causing those parts of the carriage under which they are placed to rise and fall.

The rear wheel bearing 30 carries the drive shaft 32 mounted in brackets 32ª, integral with the bearing. To the shaft is fastened the worm wheel 33 which engages the worm 29 and revolves the drive wheels 34, 34, which are fastened to the drive shaft. The drive wheels 34, 34 are eccentric so that when they are revolved they impart an up and down motion to the carriage at the rear end, and also impart an accelerating motion to the horse when its hind quarteds are rising, and a retarding motion when they are descending.

The front wheel hanger 35 is pivoted on the stud 36, which projects from and extends through the carriage 22 and is firmly held by the nut 37, the friction between the carriage and the hanger being reduced by the ball thrust-bearing 38. The forks of the bearing 35 carry the wheel shaft 39 to which the wheel 40 is fastened.

Means are also provided which permit a transverse movement of the platform with relation to the wheels, thus changing the direction of travel of the platform.

In the best embodiment of the invention, each wheel is mounted so that the platform is bodily movable on vertical axes lying outside and to one side of the axles of the wheels.

The two rear wheels are placed some distance apart but fastened to the same shaft.

If one side of the platform is raised, one of the rear wheels is lifted from the floor. This immediately shifts the center of gravity of the horse and platform and causes the platform to shift on its vertical axes until both rear wheels again touch the floor. The shifting of the platform moves the pivotal hangers between the wheels and the platform, (the wheels twisting on their points of contact with the floor). This is being continually repeated while the horse is rocking.

The metal floor 41 is fastened to the I-beams 42, by the rivets 43. The I-beams 42 are fastened to the building timbers 45 by the spikes 44, 44 and the clamps 46, 46 and are insulated from the timbers by the fibre strips 47, and from the clamps by the fibre strips 48, 48.

The motor 20 is grounded to the metal of the carriage, so that the current is conducted from the motor, through the carriage and its wheels, to the metal floor from where the wire 49 returns it to the switch 5.

A curbing 50 is placed around the floor to prevent any of the horses from leaving it, by reversing their direction when they bump against it.

A railing 51 is placed on each side of each horse to prevent the passengers from being thrown when the horses collide.

The operation of my invention is as follows:

When the platform, which supports the horse, moves over the floor and the three wheels happen to be in the position so that the longest effective radii of all three wheels are above their centers of revolution, the horse will rise and fall without rocking sideways. This motion will continue until the horse carriage bumps against another horse carriage or against the curbing and has its direction changed.

In changing the direction of travel the first time, we will assume that it is changed sufficiently to bring the long radii of the front wheels directly below their centers of revolution, while the long radius of the rear wheel is above its center of revolution. This will cause the horse to rock from front to rear while moving over the floor.

By changing the direction again, or after another collision, we will assume that the long radius of one front wheel is in the same relative position as those of the rear wheels, and that the long radius of the other front wheel is directly opposite. This causes the rear end and one side of the front end of the platform to rise, while the other side of the front end is lowered. This causes the horse to rock from front to rear and from side to side.

By changing the direction again so that no two wheels are in the same relative position, the horse's head, or for that matter the saddle or any point near the top of the horse, will describe a series of irregular curves in the air while the carriage is moving.

When the horse is rocking from side to side, the changing of the position of the center of gravity (caused by the rocking) causes the rear end of the platform to shift slightly about its supporting pivot, thus causing the horse to follow a wavy or zig-zag course at all times except when the radii of the two front wheels are in the same relative position.

The wheels, being mounted in pivoted hangers and also being of variable radius, allow the horse to travel frontwards, backwards or sidewise, or to whirl around in either direction like a top; or to produce a motion which is a combination of two or more of the above movements, and also give an up and down motion. These different movements are very similar to those employed by a wild horse or broncho in trying to throw its rider.

It will be understood that the invention is not limited to details and that numerous changes may be made in carrying it into effect without departing from the principle thereof.

What I claim as new and desire to secure by Letters Patent is:

1. An amusement ride comprising in combination a plurality of platforms, an animal figure for supporting one or more passengers mounted upon each platform, each of said platforms being provided with at least three wheels for supporting the said platform at three points, one or more of said wheels for each platform of varying radii for giving an up-and-down motion to parts of the platform, a pivoted hanger for each wheel, each of said platforms being provided with a bumper surrounding the platform, a motor for each platform for driving one of the wheels carrying the platform, a conducting floor over which the platform travels in all directions, a conducting ceiling and a trolley adapted to take current from the ceiling to supply the motors.

2. An amusement ride comprising in combination a platform, a conducting floor, an electric motor for driving said platform over said floor in all directions, a plurality of wheels, one or more of varying radii, supporting said platform, mountings for said wheels, and pivotal connections between the platform and the wheel mountings.

3. An amusement ride comprising in combination a platform, a conducting floor, an electric motor for driving said platform over said floor and a plurality of wheels, one or more of varying radii, supporting said platform said platform provided with a bumper surrounding the platform.

4. An amusement ride comprising in combination a platform, an animal figure carried by said platform for supporting one or more passengers a plurality of wheels for carrying said platform, two of said wheels being arranged beneath and toward the front of the platform and one of said wheels being arranged beneath and toward the rear of the platform, means for supporting one or more of said wheels on an eccentric axis, a pivoted hanger for each wheel projecting from said platform and a motor for driving the rear wheel.

5. An amusement ride comprising in combination a platform, a plurality of wheels for supporting said platform, two of said wheels being disposed on opposite sides of the fore and aft center line of the platform, a pair of wheels being arranged at the rear of the platform and adjacent to the center line, a motor for driving the rear wheels, hangers for said wheels, a pivot for each hanger, each of said wheels having a varying radius.

6. An amusement ride comprising in combination a platform, an animal figure mounted upon said platform, three wheels for carrying said platform, a motor for driving one of said wheels, one or more of said wheels having a varying radius, a conducting ceiling, a conducting floor, a trolley carried by the animal figure and adapted to contact with the ceiling, an electric motor for driving the rear wheel and electrical connections between said trolley and said motor.

7. An amusement ride comprising in combination a platform, means for supporting one or more passengers thereon, said platform being provided with means for giving an up and down motion to parts of the platform, a resilent bumper surrounding said platform, a conducting floor over which the platform travels, a motor for driving said platform over said floor in any direction without steering the platform, a conducting ceiling and a trolley adapted to take current from said ceiling to supply the motor.

8. An amusement device comprising in combination a platform, three wheel units for supporting said platform at three points, vertical pivotal bearings, one for each wheel unit, a supporting axle for each wheel, one or more of said wheels being eccentrically mounted upon its axle and a resilient bumper projecting from said platform.

9. An amusement ride comprising in combination a platform, means for supporting one or more passengers thereon, a plurality of wheels supporting said platform, one or more of said wheels having a varying radius adapted to rock said platform, a motor for driving one of said wheels and a resilient bumper carried by said platform, said bumper comprising a pair of metallic hoops, one within and spaced from the other.

10. An amusement ride comprising in combination a platform, an animal figure for supporting one or more passengers thereon, a plurality of wheels supporting said platform, a motor for driving one of said wheels and a resilient bumper carried by said platform, said bumper comprising a pair of metallic hoops, one within and spaced from the other.

11. An amusement ride comprising in combination a platform, means for supporting one or more passengers thereon, a plurality of eccentric wheels providing three points of support for said platform and a resilient bumper carried by said platform, said bumper comprising a pair of metallic hoops, one within and spaced from the other.

12. An amusement ride comprising in combination a platform, a plurality of wheels supporting said platform, one or more of said wheels having a varying radius adapted to rock said platform, a motor for driving one of said wheels and a resilient bumper carried by said platform, said bumper comprising a pair of metallic hoops, the inner hoop provided with a plurality of undulations and the outer hoop being in contact therewith.

13. An amusement ride comprising in combination a platform, means for supporting one or more passengers thereon, a plurality of wheels supporting said platform, one or more of said wheels having a varying radius adapted to rock said platform, a motor for driving one of said wheels and a resilient bumper carried by said platform, said bumper comprising a pair of metallic hoops, the inner hoop being provided with a plurality of undulations and means for providing a sliding contact between the inner and the outer hoops.

14. An amusement ride comprising in combination a platform, a plurality of wheels supporting said platform, a motor for driving one of said wheels and a resilient bumper carried by said platform, said bumper comprising a pair of metallic hoops, one of said hoops provided with a plurality of slots and supports passing through said slots for supporting the two hoops.

15. An amusement ride comprising in combination a platform, three wheels supporting said platform, one at the rear and two at the front on opposite sides of the center line, one or more of said wheels having a varying radius adapted to rock said platform, an animal figure carried by said platform, an electric motor for driving one of said wheels, a conducting ceiling, a conducting floor, a trolley arm provided with a roller in contact with said ceiling, a base on which said trolley arm is supported, a spring connected to said base and to said arm and means permitting said base to swivel.

16. An amusement ride comprising in combination a platform, a plurality of wheels supporting said platform, at least one at the rear and two at the front on opposite sides of the center line, an animal figure carried by said platform, an electric motor for driving one of said wheels, a conducting ceiling, a conducting floor, a trolley arm provided with a roller in contact with said ceiling, a base on which said trolley arm is supported, a plug secured to said base and a bearing with which said plug rotatably engages.

17. An amusement ride comprising a platform, an animal figure carried thereby, a pair of wheels on opposite sides of the front of the platform, a hanger for each wheel, one or more of said wheels being eccentrically mounted in their hangers, a pair of wheels beneath the rear of the platform, a shaft for supporting both of the rear wheels and a pivoted hanger for said shaft permitting said shaft to swivel about the pivot.

18. An amusement ride comprising a platform, an animal figure carried thereby, a pair of wheels on opposite sides of the front of the platform, a pair of wheels beneath the rear of the platform, a shaft for supporting both of the rear wheels and a pivoted hanger for said shaft permitting said shaft to swivel about the pivot.

19. An amusement ride comprising a platform, an animal figure carried thereby, a pair of wheels on opposite sides of the front of the platform, a pair of wheels beneath the rear of the platform, a shaft for supporting both of the rear wheels, a pivoted hanger for said shaft permitting said shaft to swivel about the pivot, and a motor for driving said rear pair of wheels.

In testimony whereof, I have signed my name to this specification.

CORNEIL J. BRILSTRA.